July 14, 1970  HIROSHI ASHIZAWA  3,520,451
SANITARY MILK DISPENSER
Filed May 6, 1968  3 Sheets-Sheet 1
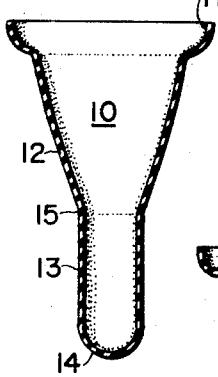
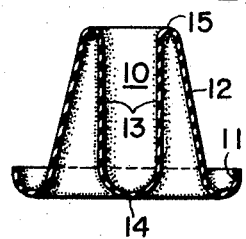
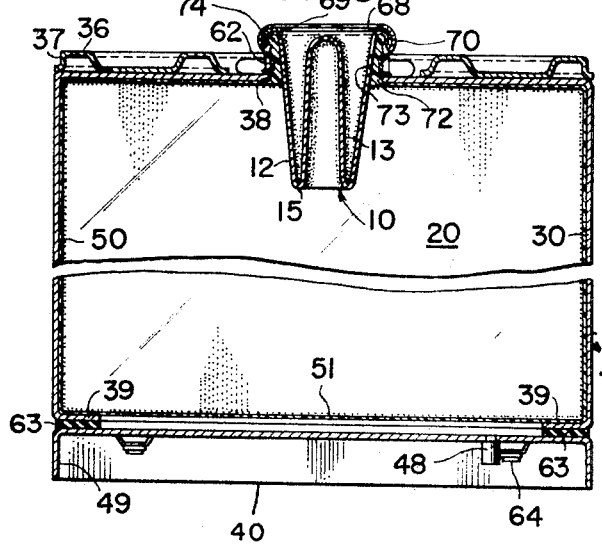
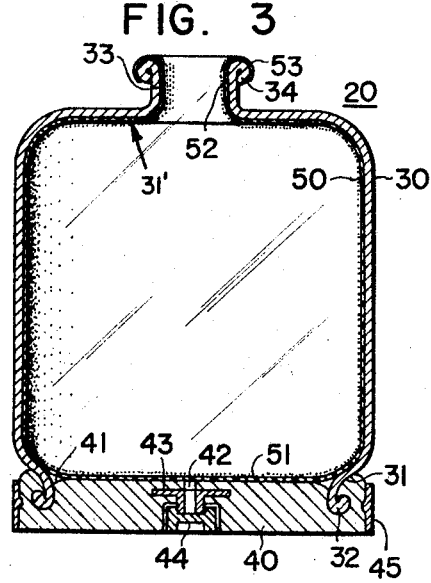
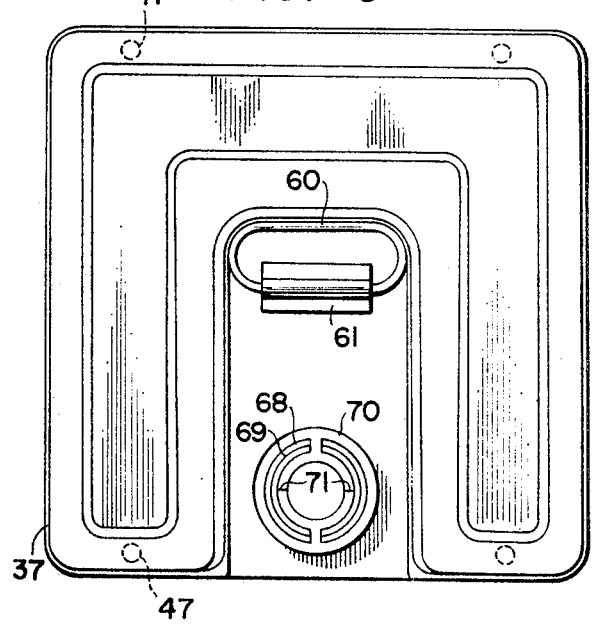
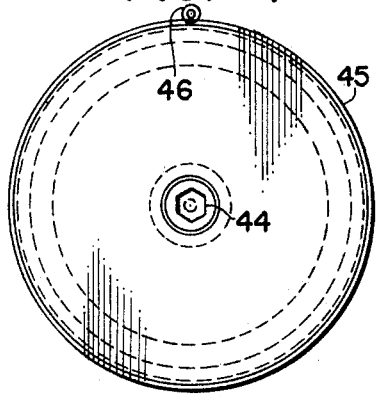
INVENTOR
HIROSHI ASHIZAWA
BY *Otto John Munz*
ATTORNEY

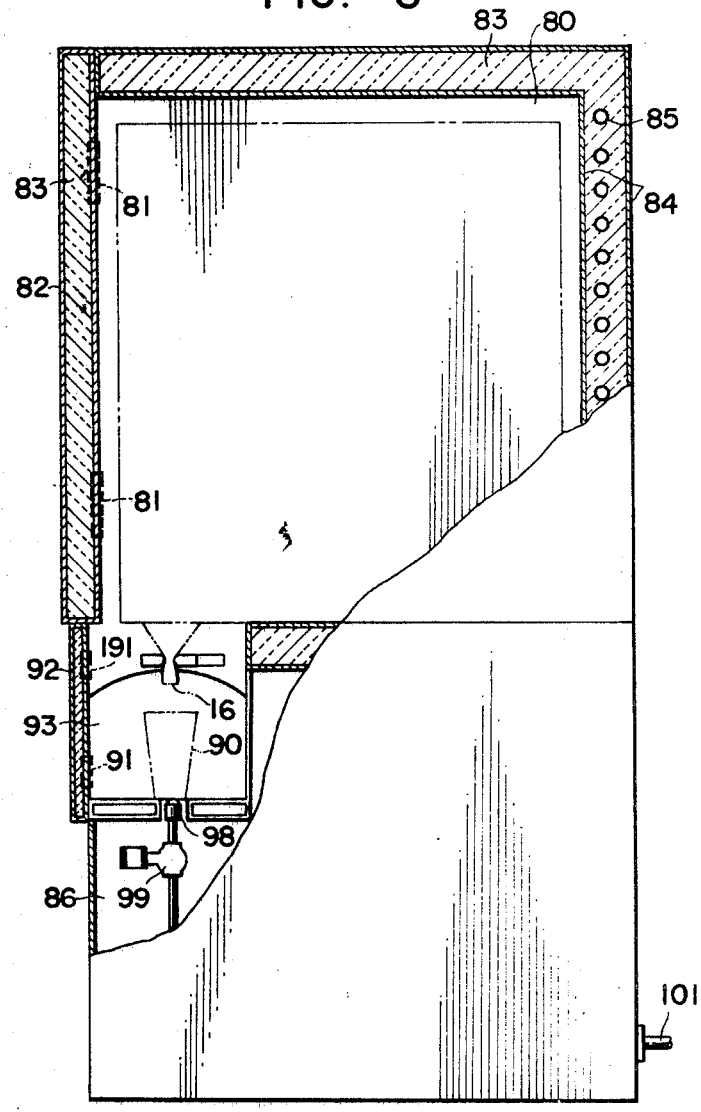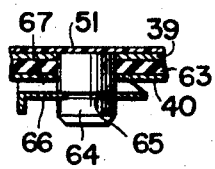

INVENTOR
HIROSHI ASHIZAWA

BY *Otto John Munz*
ATTORNEY

United States Patent Office 3,520,451
Patented July 14, 1970

3,520,451
SANITARY MILK DISPENSER
Hiroshi Ashizawa, 1, 111 Kitakase, Kawasaki-shi,
Kanagawa, Japan
Filed May 6, 1968, Ser. No. 726,831
Claims priority, application Japan, May 17, 1967,
42/30,852, 42/30,853
Int. Cl. B67d 1/08
U.S. Cl. 222—148                                    8 Claims

ABSTRACT OF THE DISCLOSURE

A sanitary milk dispenser having a refrigerated cup receiving and machine department in which milk is dispensed from a V-shaped flexible tube, which is fitted to an inner container and which can be made to form the inverse shape of a W for purposes of transportation, by the fixed pressure of a pressure medium led to the space between the outer container and the flexible inner container enclosed within said outer container. Control apparatus is provided so that clean water spouts into the dispensing end of tube when a cup is removed from the cup receiving compartment below the milk tube and stops spouting when a cup is set thereon.

BACKGROUND OF THE INVENTION

This invention relates to a milk dispenser and more particularly to a milk dispenser comprising a refrigerated compartment enclosing milk containers, a cup receiving compartment in which a fixed amount of milk is dispensed to a cup from a milk container, and a machine compartment containing a refrigeration unit which provides the refrigeration for said refrigerated compartment.

Milk, as is well known, is apt to change in quality very easily and, as is also well known presents a suitable place for micro-organisms to grow. These micro-organisms are mainly lactic acid bacilli, but occasionally they are pathogenic bacteria and saprogenous bacillus. In this respect, milk is very difficult to deal with compared with natural juice for drink.

In a conventional milk dispenser milk is kept in a container at low temperature to prevent any change in quality. The container is typically provided with vents in the upper part thereof for communicating air to the interior of said container and with a dispensing tube extending from the bottom thereof for dispensing milk into cans. The tube having a pinch-off point located along its length with air in contact on the outside and milk in contact on the inside of said point. Two problems are presented by such a conventional dispenser. Namely; the air which is allowed to communicate through the vents in the container is apt to render the milk therein contained unsanitary, and because the area of the pinch-off point in contact with air presents a suitable place for bacteria to propagate, the process of replenishing an empty milk can with fresh milk from the container through the area of bacterial contamination may spoil the sterilization applied to the milk in the milk plant and thereby make said milk unsanitary.

SUMMARY OF THE INVENTION

The main object of the present invention is, therefore, to provide a sanitary milk dispenser which will prevent air from coming into contact with the surface of milk in the container and by keeping the dispensing end of the tube clean, that is, free from bacterial contamination.

Another object of the present invention is to provide a milk container which is not only convenient for transportation but also applicable for a dispensing operation avoiding the requirement of transferring the milk content to a separate container, and and thereby eliminate the unsanitary process of replenishing with fresh milk said separate container when empty with fresh milk The milk dispenser relating to the present invention is the same as the conventional type in the respect that it can be divided into three compartments, that is, a refrigerated compartment, a cup receiving compartment, and a machine compartment. But in this invention the milk container consists of an outer metallic container, a cover, an inner container and a tube. The outer container of metal is open for the most part at both ends. The cover is detachably fixed and seals one open end of the outer container while the inner container which is made of a flexible synthetic resin, lines the inner surface of the outer container. The tube is attached to the other open end and acts to funnel milk into cups.

A sectional view of the milk tube is shown to be partially V-shaped. The sealed end portion can be pushed inside of the container forming the inverse shape of a W and can be protruded by pulling and stretching it to form the V-shape again. The containers being placed upside down in the refrigerated compartment, with the sealed end portion of the milk tube is oriented downwardly forming the V-shape. After pinching off the middle portion of the tube by a pinch valve, the milk tube is cut below the pinch off point to provide a usable dispensing end.

A spray nozzle of a washing apparatus is provided on the bottom of a cup receiving compartment of the dispenser. Washing of the dispensing end of the tube can be done by control means in which clean water is spouted on said dispensing end whenever a cup is removed from the cup receiving compartment but not while a cup is in place for receiving milk in said compartment.

The air contact with the surface of the milk in the inner container is intercepted completely by the wall of the inner container which, as has been previously mentioned, lines the outer container. Moreover, the dispensing end of the tube which is the only place in contact with air is made clean, whenever milk is not dispensed, by the spouting of clean water upon same. As control means for the washing apparatus, for instance, well-known phototubes are mounted on both sides of the cup receiving compartment, which close a magnetic valve when the rays applied are interrupted by a cup and open the valve when the rays are not interrupted. Application of this construction and washing apparatus prevents noxious bacteria from propagating, and it keeps the milk always clean.

Milk in the inner container is continuously pressed at a fixed pressure by means of a pressure medium which is led through a nipple in the cover to the space between the inner container and the outer container by a pressure supply means. A fixed amount of dispensation of milk, therefore, can be accomplished easily by opening a pinch valve for a fixed time. In an automatic vending machine the opening of the pinch valve for a fixed time can be accomplished by application of a timer and well-known control means simultaneously, which sense a number of coins passed through a slot and give an order to open a valve. The pressure medium is, preferably, water. Gas, for instance compressed air, can be applied as the pressure medium, but in this case the temperature must be adjusted to room temperature.

The milk tube being provided to be inserted into the interior of the inner container forming the inverse shape of a W, makes it very convenient to transport the container. Further, as the tube inserted can be pulled and stretched forming a V-shape, it is very easy to apply it also as a dispensing container. After milk is emptied the inner container is removed from the outer container and a new inner container filled with fresh milk is replaced. In this manner there is no reason to be concerned about unsanitary conditions when milk is replenished.

3,520,451

For a better understanding of the invention, as well as further objects and features thereof, reference is made to the following detailed description to be read in conjunction with the accompanying drawings, wherein like figures are represented by like reference numerals.

BRIEF DESCRIPTION OF THE DRAWINGS

In the drawings:

FIG. 1 and FIG. 2 are sectional views of a sealed end portion of the milk tube to be fitted to the milk container.

FIG. 1 shows the milk tube protruded forming a V-shape.

FIG. 2 also shows milk tube pushed in so as to form inverse shape of W.

FIG. 3 is a sectional view of the milk container of the first embodiment not fitted with a milk tube.

FIG. 4 is a plane view of the cover illustrated in FIG. 3.

FIG. 5 is a sectional view of the milk container of a second embodiment shown in position for transportation.

FIG. 6 is a plane view of the milk container shown in FIG. 5.

FIG. 7 is an enlarged sectional view in part illustrating how the outer container of FIG. 5 is connected with the cover through the medium of a connecting knob and a legged metal fitting clip.

FIG. 8 is a side view, partly in section, illustrating a construction of the milk dispenser of the present invention.

PREFERRED EMBODIMENT OF THE INVENTION

Figure 9:
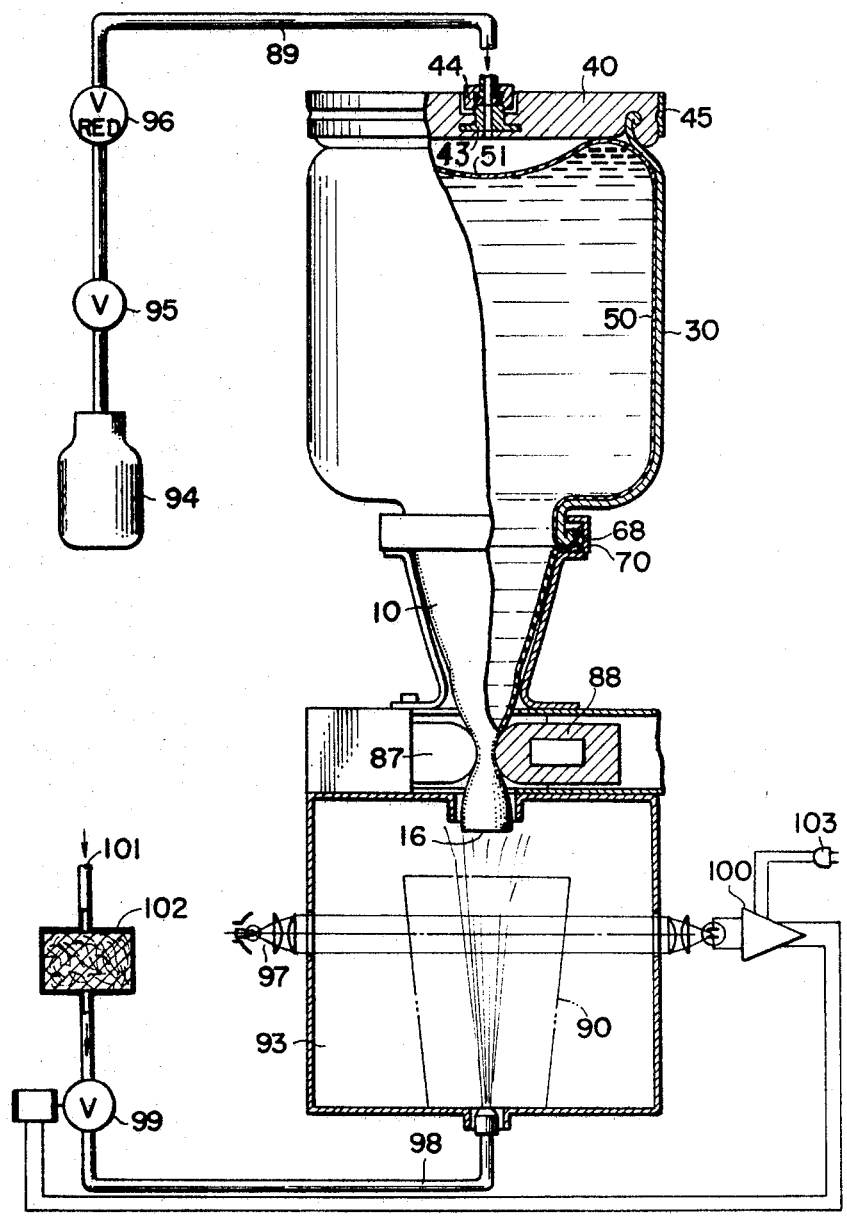
FIG. 9 is an explanatory schematic view illustrated in order to help in the understanding of the dispensing operation of the milk dispenser and washing operation of the dispensing portion of the tube relating to the present invention.

As to the first embodiment of the present invention.

In FIG. 1 and FIG. 2 reference numeral 10 shows a milk dispensing tube which consists of opening portion 11, conical surface portion 12, cylinder surface portion 13 and sealed end portion 14. When the conical surface portion 12 of the protruded tube 10 shown in FIG. 1 is turned inside out, the tube will be bent at point 15 as shown in FIG. 2 forming the inverse shape of a W. Then if the cylinder surface portion 13 of FIG. 2 is pulled and stretched outwardly, it is protruded as shown in FIG. 1.

In FIG. 3 and FIG. 4 reference numeral 20 shows a milk container assembly which comprises a stainless steel outer container 30, a rubber cover 40 and a polyethylene inner container 50. Outer container 30 has a thin walled cylindrical body portion having a constant diameter cross section with openings at both ends. At one end thereof the wall 31 circumferentially tapers abruptly inwardly and then terminates in an outwardly curled free end 32 thereby forming a wide opening. At the other end thereof the wall 31¹ is circumferentially bent inwardly thereby forming an end surface terminating with a small opening 52 having its center coincident with the longitudinal axis of said cylindrical body portion. Extending outwardly from wall 31¹ and said opening 52 is cylindrical wall 33 terminating in circumferentially curled free end 34.

The inner container 50 is inserted into the outer container 30 through the wide opening. It conforms to the contours of the outer container and resembles a liner for the inner walls of said outer container. In addition, the bottom 51 of the inner container 50 closes the wide opening formed at one end of the outer container 30, while free end 53 covers the surface of the free end 34 at the other end of said outer container.

The cover 40 is fixed tightly to the free end 32 of the outer container 30 by the insertion of free end 32 within groove 41. Fastened about the circumference of the cover 40 is a steel band 45 on which a metal clamp 46 is detachably mounted for adjusting the pressure exerted by the band 45. A nipple 43 is embedded within the cover concentric with a hole 42 which is located substantially at the center of the cover. A cup nut 44 is screwed on the nipple 43, and so arranged that a pressure medium is led against bottom 51 of the inner container 50 and into the outer container 30 through the hole 42.

Milk is fed into inner container 50 through opening 52. After filling the inner container 50 a milk dispensing tube 10 is fitted over curled free end 34 to embrace the outer surface of cylindrical wall 33 thereby closing and sealing opening 52 and placing container assembly 20 in condition for shipment. A detailed description of this seal will be made in conjunction with the second embodiment.

As to the second embodiment of the present invention:

FIGS. 5 and 6 illustrate the second embodiment of the present invention. Stainless steel outer container 30 is cubic in shape with openings in both the top and bottom surfaces thereof. The opening in the bottom surface is circular and extends for almost the full area covered by said surface. Flat portion 39 defining the outer border of said opening. The opening in the top surface is also circular but much smaller in diameter and located closer to one edge. Contiguous with and extending from this opening is a cylindrical extension or fitting pedestal 72 made of polyethylene. This fitting pedestal 72 which consists of opening portion 73 and circumferentially outwardly curled free end 74 is moulded and welded with the inner container 50 also made of polyethylene. This inner container, as in FIG. 3, conforms to and acts as a liner for the entire inner surface area of outer container 30 with bottom surface 51 closing the circular opening in the bottom surface of outer container 30. Also as in FIG. 3, fitting pedestal 72 is utilized to support a milk tube 10 thereon. The tube is extending into containers 30 and 50. A blind cover 68 extends over the opening formed by milk tube 10 and has a circumferential end portion conforming with and lockingly engaging curled free end 74 of fitting pedental 72. Resting on the top surface of outer container 30 and surrounding fitting pedestal 72 but not extending the full length thereof is protector 62 which is provided to reinforce fitting pedestal 72. On the remaining top surface of outer container 30 there is provided reinforcing ribs 36 and handle grip 60 which is secured to said top surface by metal fitting 61.

Referring now to both FIGS. 5 and 7, four knobs 64 having diches 65 on the circumference thereof project outwardly from the flat edge portion 39 of the bottom of outer container 30 in order to fix the outer container 30 to a stainless steel cover 40. These four knobs 64 fit respectively to the four holes 47 (FIG. 6) of the cover 40 through the medium of packings 63. The dich 65 of the knob 64 is fitted with a metal fitting leg, so that the outer container is fixed tightly with the cover 40 which has a nipple 48 so as to lead a pressure medium through it into the container.

A skirt 49 of the cover 40 is provided so that it may fit to the vertical surface 37 of the outer rib 36, thereby making it possible to stack several containers one upon the other.

After filling the inner container with milk through the opening 73, fitting the milk tube 10 onto the free end 74 of the container and with blind cover 68 in place, the milk container is ready for transportation as shown in FIG. 5 and FIG. 6.

When the milk container is to be used in a dispensing operation, it is necessary first to cut the protector 70 at the position 71, detach the blind cover 68 on the perforated line 69.

After detachment of the blind cover 68, the sealed end portion of the tube is picked with fingers and pulled and stretched forming a V-shaped cone extending out from the top of the outer container (FIG. 9).

Turning the milk container upside down, a pipe 89 provided in order to lead a pressure medium into the container is connected with the nipple 43 laid in the cover 40 as shown in FIG. 9, and then the milk container is placed into the refrigerated compartment shown in FIG. 8.

All of the refrigerated compartment inclusive of front door 82 is double wall construction and between the walls cold insulation materials 83 are stuffed. Cooling pipe 85 arranged between the walls is connected with a refrigeration unit (not illustrated) in the machine compartment 86 and, therefore, an average interior air temperature in the refrigerated compartment is adjusted in the range of from 35° to 38° Fahrenheit.

The milk tube 10 is, after pinching near the free end thereof with a fixed valve seat 87 and a movable valve seat 88 of the pinch valve, cut at the sealed end portion thereof to form a dispensing end. Cup 90 is taken in and out from the cup receiving compartment by opening the front door 92 swingably fixed to the cup receiving compartment with hinges 91. A spray nozzle for clean water to spout upwardly is provided at the bottom of a cup receiving compartment on a vertical extension line connected with washing means.

To make clearer the construction of the present invention, reference is made to FIG. 9. Milk in the inner container 50 is continuously compressed by a fixed pressure of gas communicated by a gas cylinder 94 through a stop valve 95, a stress regulator valve 96, a pipe 89 and nipple 43 laid in the cover 40.

Opening portion 11 of the milk tube 10 (see FIG. 1) being tightly sealed with the remaining round edge of the blind cover 68 and protector 70, thereby prevents leakage. By means of opening and shutting of a movable valve seat of the pinch valve which can be operated by hand (for instance, lifting up a lever, or pushing a button) or by a signal (for instance, a signal made by coins passed through a slot, or a signal made by inserting a cup), milk is dispended into the cup from the dispensing end portion of the container. Opening of the valve for a fixed time is controlled by a timer.

Phototube apparatus is mounted on both sides of the cup receiving compartment, the rays of which are intercepted when a cup is set in the cup receiving compartment below the milk tube and are not intercepted when the cup is removed. Electro-magnetic valve 99 which controls water spouting is electrically connected with the phototube apparatus through the medium of amplifier 100. The phototube 97 and the electro-magnetic valve 99 are so arranged that clean water is spouted from a spray nozzle 98 by way of a water-pipe 101, a filter 102 and the electro-magnetic valve 99 to the innermost of the dispensing portion of the tube when the cup is removed. When rays of the phototube are intercepted by setting the cup 90 on the cup receiving compartment 93, water stops spouting immediately.

Only preferable embodiments according to the present invention have been shown above. However, even if any alternation or modification is made within the scope of the appended claims, it will not deviate from the subject matter of the present invention.

What is claimed is:

1. A milk dispenser comprising a refrigerated compartment, a cup receiving compartment, a machine compartment, pressure supply means by which a pressure medium is led to the space between an inner container and an outer container, washing apparatus to wash a dispensing end portion of a milk tube, and control means for said washing apparatus, in which:

said refrigerated compartment includes a milk container consisting of an inner container made of flexible synthetic resin fitted tightly with a milk tube at a milk inlet portion thereof, an outer container made of steel having an opening wide enough for insertion of said inner container, and covers detachably fixed to opening portions of said outer container;

said cup receiving compartment is provided with a gateway so as to make way for a cup in which milk is dispensed from said dispensing end portion of said milk tube by means of a pinch valve when said cup is set in the compartment;

said machine compartment includes a pressing apparatus by which milk in the flexible inner container is pressed by means of pressure medium from the outside of the inner container and a refrigeration unit;

said washing apparatus, comprising an electro-magnetic valve and a spray nozzle fitted to the bottom of the cup receiving compartment, washes said dispensing end portion of the milk tube; and said control means for said washing apparatus closes said electro-magnetic valve while a cup is setting in the cup receiving compartment and opens said valve when said cup is removed from said compartment so as to wash the dispensing end portion of the milk tube.

2. The milk dispenser set forth in claim 1 wherein said control means for said washing apparatus have photo-tubes on both sides of the cup receiving compartment and so arranged that rays applied by the photo-tubes are intercepted when a cup is in the cup receiving compartment under the milk tube and are not intercepted when said cup is removed.

3. The milk dispenser set forth in claim 1, wherein one of said covers is fixed to the outer container by a plurality of connecting knobs having ditch projecting out from a free end of said outer container.

4. The milk dispenser set forth in claim 1 wherein the other of said covers having holes on the surface thereof surrounded by packing disposed between said cover and said outer container through which is fitted said connecting knobs, and fixed with the outer container by means of legged metal fittings which are to be fitted in the ditches of the projecting knobs.

5. The milk dispenser set forth in claim 1 wherein said milk tube having a sectional view of V-shape, which can also form substantially the inverse shape of a W, is fitted tightly to the free end of the milk inlet portion and covered by a blind cover, which can detach on a perforated line by pushing the center thereof.

6. The milk dispenser set forth in claim 4 wherein said other of said covers is provided with a skirt in which ribs provided on the surface of said outer container are fitted precisely.

7. A container for a milk dispenser comprising: a inner container of flexible synthetic resin having a milk inlet opening; an outer container having a first opening wide enough to insert said inner container therethrough and having a second opening on the opposite side of said first opening formed by a cylindrical extension thereof, said second opening being fitted in abutment with said milk inlet opening of the inner container; a cover removably fixed to said first opening of said outer container and having means therein for leading a pressure medium to the space between said inner container and said outer container; and a flexible tube fitting tightly to said milk inlet opening of said inner container; said tube forming substantially a V-shape in section in the protruded position and the inverse shape of a W in the retracted position; said second opening and said milk inlet of said inner container being covered with a blind cover which can be removed along a perforated line by pushing the center thereof; and a protector surrounding said cylindrical extension.

8. A container for a milk dispenser comprising: an inner container of flexible synthetic resin having a milk inlet opening; an outer container having a first opening wide enough to insert said inner container therethrough and having a second opening on the opposite side of said first opening formed by a cylindrical extension thereof, said second opening being fitted in abutment with said milk inlet opening of the inner container; a cover removably fixed to said first opening of said outer container and having means therein for leading a pressure medium to the space between said inner container and said outer container; and a flexible tube fitting tightly to said milk inlet opening of said inner container; said tube forming substantially a V-shape in section in the protruded position and the inverse shape of a W in the retracted position; said outer container having connecting knobs provided with ditches and projected outwardly from the bottom of said outer container; said cover having holes with said connecting knobs projectable therethrough; and said outer container and said cover capable of being fixed together by means of metal fittings, each of said metal fittings having a leg portion and fitted to a ditch of said connecting knob; said cover being provided with a skirt formed to fit precisely around the outer surface of ribs provided on the surface of the outer container of another said container for a milk dispenser whereby stacking of one said container upon said another said container is enabled.

References Cited

FOREIGN PATENTS 599,012 10/1959 Italy.

STANLEY H. TOLLBERG, Primary Examiner